United States Patent Office 3,509,998
Patented May 5, 1970

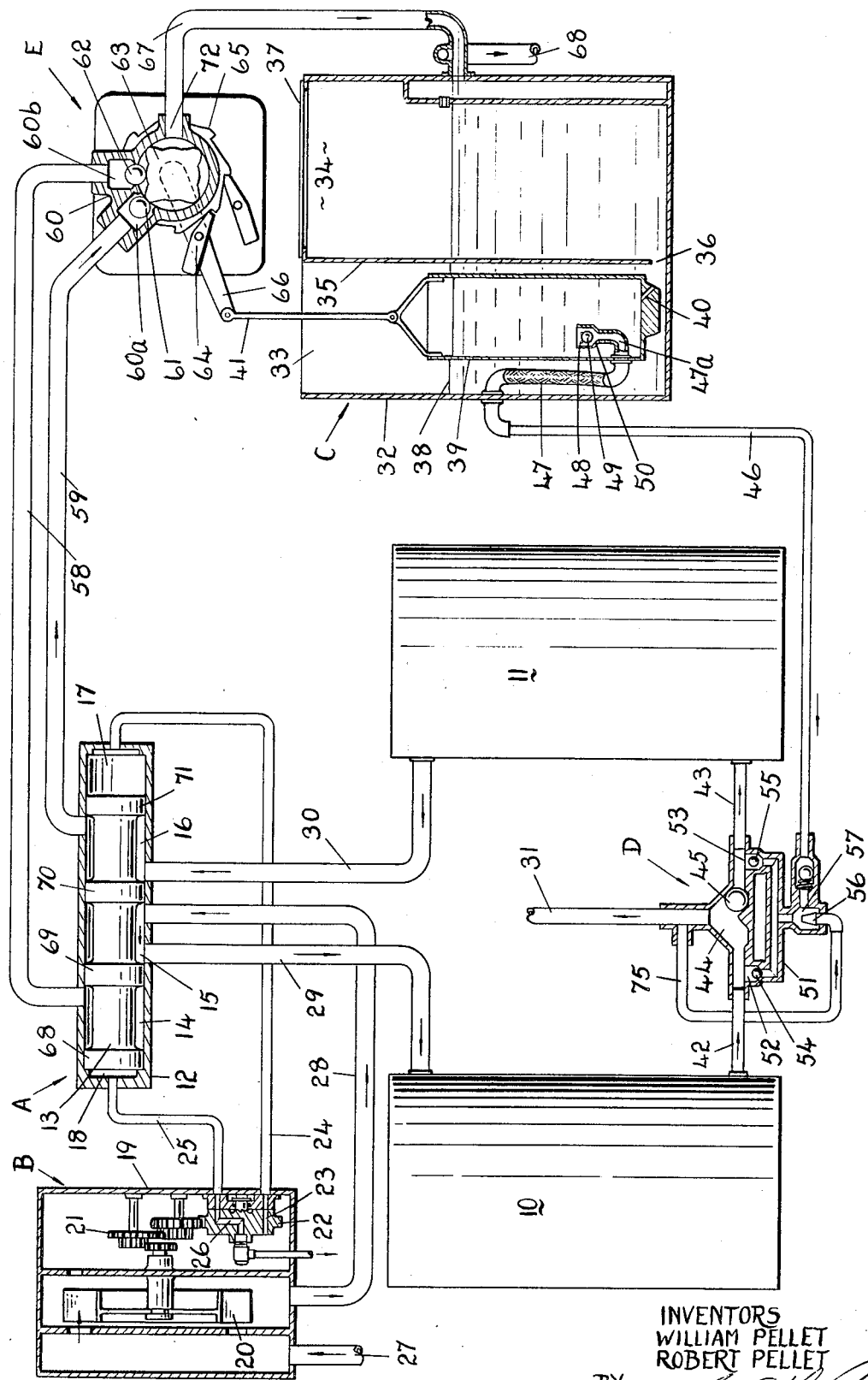

3,509,998
AUTOMATIC REGENERATING APPARATUS FOR WATER SOFTENER
William H. Pellett, 657 Balliol St., Toronto 7, Ontario, Canada, and Robert G. Pellett, 56 Markham Road, Richmond Hill, Ontario, Canada
Filed May 9, 1967, Ser. No. 637,194
Claims priority, application Canada, May 19, 1966, 960,767
Int. Cl. C02b 1/76; B01d 35/12
U.S. Cl. 210—98
9 Claims

ABSTRACT OF THE DISCLOSURE

A complete hydraulically controlled soft water system including hydraulically interacting valves, automatically actuated by water flowing through the system to supply, on demand, soft water from one tank and to regenerate the ion exchange resin in the other tank. In essence, a hydraulic pilot valve periodically actuates a master hydraulic valve to alternately connect one of two tanks to a pressurized water supply system. As one tank is isolated from the supply system, it is automatically connected to a brine supply line for regeneration of the ion exchange resin while the other tank supplies soft water.

---

This invention relates to an automatic water softening system having hydraulically actuated components for automatically and continuously supplying soft water, on demand, to a soft water supply system.

The systems currently in use, for domestic applications, usually consist of only one tank with ion exchange resin. This tank is taken out of service while being regenerated, a hard water by-passed service usually supplying the system during regeneration. For industrial applications current practice is to have two or more tanks on line at all times except that each tank is taken out of service one at a time only while being regenerated.

It is an object of the present invention to provide a completely hydraulically controlled soft water system for delivering a continuous supply of soft water and thus eliminate all electrically actuated mechanisms heretofore employed. This gives greater mechanical simplicity.

Another object is the provision of an automatic brine system having freedom from accidental overflow; a regeneration system based on water consumption which eliminates the hazard of hard water during a period of heavy demand and over-consumption of salt during periods of light demand.

A further object of the present invention is the provision of means for continuously maintaining the brine tank at its correct level by returning a part of the spent regenerant to maintain the liquid level without overflow or flooding. Consequently, the only attention that the system requires is to replenish the salt in the brine reservoir.

The automatic soft water system of the present invention comprises hydraulically interacting valve means automatically actuated by the water flowing through the system to supply, on demand, soft water from one tank and to regenerate the ion exchange resin in the other tank comprising the combination of:

(a) an hydraulically actuated master valve having a conduit system alternately connecting each tank to the pressurized water supply system;
(b) an hydraulically actuated pilot valve responsive to the flow of a predetermined quantity of water through the water softening system to periodically actuate the master valve to alternately;
  (i) connect the pressurized water supply source to a first tank for softening the water and supplying soft water to the soft water system, and
  (ii) simultaneously isolate the second tank from said water supply source and automatically connect said tank to the brine pipe line to supply brine for effecting the regeneration of the ion exchange resin in the said second tank;
(c) an hydraulically actuated double acting ball valve disposed in the soft water supply system between said tanks, said valve being responsive to a change of direction of flow through said valve to occupy a sealed position isolating the second tank from the flow of soft water during the said tank's regeneration;
(d) a brine dispensing compartment contained within the brine reservoir for holding a measured quantity of brine and having a metering orifice communicating with the brine reservoir to refill said compartment after each regeneration;
(e) a brine conduit system having at one end a pair of outlets communicating with the soft water supply conduit system, said outlets being positioned on opposite sides of the double acting ball valve and the other end of the brine conduit system being connected to the brine compartment, and a check valve in each outlet one biased to be seated by the pressure of the fluid in the first tank and the other to be unseated by the fluid flow in the brine conduit system during regeneration and flushing of the second tank;
(f) a suction device operatively connected to the soft water conduit system and to the brine conduit system to withdraw a predetermined quantity of brine from the compartment and pass it through the second tank followed by a predetermined quantity of fresh, unsalted water to flush the brine therefrom;
(g) a check valve closing the end of the brine conduit system within the brine compartment and normally unseated when covered with brine permitting the brine to flow into the suction system and be discharged into the second tank and to seat when the brine is exhausted therefrom and remain seated until the termination of the flushing of the second tank;
(h) a spent regenerant conduit system communicating with each tank through the master valve and with the brine reservoir;
(i) and time delay hydraulic valve means operative to stop the flushing of the second tank and the suction device after the predetermined quantity of fresh water has passed through said regenerated tank to thereby reset the system for the automatic regeneration of the first tank when the predetermined quantity of water has flowed through the system.

Other and further advantages of the invention will be apparent from the following description of the apparatus which is diagrammatically illustrated in the accompanying drawing which shows a preferred embodiment of the invention. It will be understood by those skilled in the art that the specific structure illustrated is given for the purpose of illustration and not by way of restriction as it will be apparent that the structure disclosed may be modified and changed without departing from the scope of the invention.

The automatic water softening system illustrated in the drawings comprises a hydraulically actuated master valve generally referred to and identified by the reference letter A, which valve is controlled by an hydraulically actuated pilot valve generally indicated by the letter B, said pilot valve being responsive to the flow of a predetermined quantity of water through the soft water system for carrying out the automatic sequence of operation herein described; a first tank 10, and a second tank 11, each tank containing an ion exchange resin; a brine supply reservoir generally indicated by the letter C; a suction system generally indicated by the letter D which automatically reacts with the first hydraulically actuated master valve A to first draw a measured quantity of brine solution from the brine reservoir C and discharge it into one of the tanks to carry out the regeneration of the ion exchange resin therein and at the same time isolate said regenerating tank from the soft water system, and at the conclusion of the regeneration of the ion exchange resin to flow a predetermined volume of fresh water through the regenerated tank until substantially all trace of the brine has been removed therefrom; and an automatically actuated hydraulic shut off valve generally indicated by the letter E which resets the system at the end of said flushing cycle for the next regeneration cycle. For the purpose of clarity in describing the invention the tanks have been called the first tank and the second tank with the first tank 10 shown as supplying soft water to the soft water system while the second tank 11 is isolated therefrom and is undergoing regeneration.

The hydraulically actuated master valve A comprises a closed cylinder 12 having mounted therein a piston-type sliding valve 13 formed with four heads 68, 69, 70, and 71. In the present construction, the piston 13 is reduced in diameter between the heads 68, 69, 70, 71 to form three separate fluid passages 14, 15, and 16 between the periphery of the piston and the internal wall of the cylinder. The passage 15 forms part of the hard water supply system while the passages 14, 16 form part of the conduit system for spent regenerant as will be more particularly described hereinafter. The ends of the cylinder are formed with pressure chambers 17, 18.

The hydraulically actuated pilot valve B comprises a casing in which is mounted a water driven wheel 20 that, through the gear train 21 drives a rotatable pilot valve 22 which controls the automatic operation of the water softening system and has two operative positions spaced 180° apart. The gear train is designed to rotate the pilot valve from one of its operative positions to its other operative position after a predetermined quantity of water has run through the system, all of which will be described in more detail later in the specification. The pilot valve is provided with a pilot passage 23 which communicates with pressurized water in the casing 19 and alternately, depending on the position of the pilot valve, with conduits 24, 25 leading to the pressure chambers 17, 18 respectively of the master valve and a pressure relief passage 26 which communicates with the other passage (passage 25 in the position illustrated) to drain the fluid from the pressure chamber 18. The drawings show the system at the beginning of the regeneration of the tank 11 with the tank 10 delivering soft water on demand. The interacting valve means which include not only the valves already described but those which will be described later, are in position to carry out their various functions of automatically carrying out the sequence of operation for supplying, continuously, soft water on demand.

The casing 19 has a conduit 27 which is connected to a source of hard water under pressure such as the ordinary municipal water supply service and to the master valve by means of a hard water supply conduit 28, the conduit 28 being tapped into the cylinder 12 midway between the ends and in communication with the passage 15 so that irrespective of the position of the piston 13 the main conduit will always be in communication with the passage 15. The water passing through the casing 19 from the conduit 27 to the conduit 28 must pass over the water wheel 20 to drive the same to bring the rotatable pilot valve 22 into one of its two operative positions. Water pressure is introduced into one of the pressure chambers to reciprocate the sliding valve 13 and at the same time provide an exhaust route for water from the opposite end through the pressure relief passage 26. In the position shown in the drawing, the rotatable pilot valve 22 has moved to a position to introduce water under pressure into the chamber 17 and permit the expelling of the water from the chamber 18 thus permitting the piston to take the position shown. The piston remains in this position until the rotatable pilot valve 22 has been rotated by a predetermined number of gallons of water run through the system to bring the rotatable pilot valve to a position 180° from that shown at which moment the piston will be reversed.

The hard water supply is connected to the tanks 10, 11, through branch conduits 29, 30 which are tapped into the cylinder 12 one on either side of the conduit 28 and positioned so that only one tank at a time will be in direct communication with the source of hard water under pressure thereby isolating the other tank so that it can be regenerated as herein described. In the position shown the tank 10 is receiving hard water from the municipal service, treating it to remove its hardness by passing it over the ion exchange resin and then delivering that water to a soft water delivery system indicated by the conduit 31 and the other tank is being regenerated during which cycle the conduit 30 forms part of a spent regenerant conduit system for discharging the spent regenerant therefrom. The remainder of the spent regenerant conduit system which leads from the master valve will be described in conjunction with the valve mechanism and other components relating to the regenerating system.

The brine solution for supplying brine during the regeneration cycle and the related components comprise a brine reservoir 32 divided into two compartments 33, 34 by partition 35, the compartments being in communication with each other through a passage 36 adjacent the bottom of the reservoir. The compartment 34 is provided for holding a supply of salt (sodium chloride) in a quantity sufficient for several regeneration cycles and water to form a brine solution. Access to the compartment 34 is obtained through the hatch 37 which closes the compartment 34. The means by which spent regenerant is admitted to the reservoir to maintain it at its proper level will be described later. The compartment 33 contains only brine solution up to the general level indicated by the line 38 which is also the level of the solution in the compartment 34. Brine density will cause a variation in the level between the compartments. There is mounted within the compartment, in the present construction, a submersible brine container 39 which holds brine to regenerate the ion exchange resin in one of the tanks during a regeneration cycle. The dispensing container 39 has formed in the bottom thereof a metering orifice 40 in communication with the brine in the compartment 33 for refilling the brine dispensing container 39 at the end of each regeneration cycle as hereinafter described. The brine container 39 is designed to have an up and down movement, which movement actuates the hydraulic valve means E to stop the suction action at the end of each flushing cycle by means of a connecting rod 41 which is operatively connected to a valve actuating lever which will be described later.

The regenerating and flushing system will now be described and comprises, in part, branch pipes 42, 43 leading respectively from the tanks 10, 11 to the soft water supply conduit 31 through a valve body 44 which is constructed to incorporate the suction system D for regeneration and flushing. The valve body 44 houses an hydraulically actuated ball valve 45 located in the soft water conduit between the adjacent ends of the conduits 42 and 43, said valve 45 being actuated by the flow of soft water to isolate the container being regenerated and permit free flow from the other tank into conduit 31. In the present illustration, the ball valve 45 has been actuated by the flow of soft water to the position shown, in which position the ball valve 45 is held seated by the pressure in the soft water delivery system to isolate the tank 11. The ball valve 45, as will be seen in the drawings, has two positions and will react to the direction of flow through the tanks to be shifted from one position to the other position as the tanks are called on to deliver soft water by the action of the master hydraulic valve A.

The position of the ball valve 45 also controls the direction of flow of brine solution and also the flushing action through a novel arrangement of hydraulic actuated valves which are responsive to the master valve. That novel arrangement comprises the following components. The conduit system for passing brine solution alternately through the tanks comprises the pipe line 46 which has one end coupled to and communicating with the brine dispensing container 39 by a flexible connection 47 which will not interfere with the up and down movement of the dispensing container 39. The flexible section 47 has its end 47a extending into the dispensing container adjacent the bottom thereof, the end 47a being provided with a cage 48 which contains a buoyant check valve 49 that can drop on a valve seat 50 when the container has been emptied of brine solution at the end of the regeneration of the ion exchange resin. With the ball floating at the top of the cage, it is possible for brine to be drawn through the valve seat below the ball, as herein described, to pass through the tank 11 to regenerate it. Brine container 39 holds sufficient brine together with that *which flows in before valve 49 closes* to effect regeneration. A considerable proportion of the needed brine enters the compartment while system is drawing brine. When the brine level lowers sufficiently the ball contacts its seat and thereby stops further flow from the cage through the seat and through the conduit 46. Suction in the line 46 will hold the ball on the seat even when the container is completely refilled with brine. This function of the ball remaining seated is necessary, in the present construction, to accomplish the flushing action for removing, at the end of the regeneration cycle, all of the brine solution from the tank 11 before it is brought into action for delivering soft water.

The pipe line 46, at its other end, communicates with a suction device comprising a body portion 51 having passages therethrough which communicate with the pipe line 46 and with the valve body 44 on either side of the ball valve 45 through outlet openings 52, 53. The outlets 52, 53 are each provided with hydraulically actuated ball check valves 54, 55 which are normally seated with one being unseated by the flow of brine being supplied to the tank undergoing regeneration. In the present illustration, ball valve 54 is seated by the fluid pressure in the soft water supply system and ball valve 55 is released to permit brine solution to flow into the tank 11. The ball check system 54, 55 serves the sole purpose of preventing water under line pressure flowing from the softener in service, to the softener being regenerated. Without these ball checks line pressure in chamber 57 would prevent siphoning action. Brine is prevented from entering the system delivering soft water by pressure differential opposing such flow. The device for injecting the brine solution into the fluid flow through the container 11, or the container 10 when it is being regenerated, during regeneration consists of pipe 75 which is tapped into the soft water supply conduit 31 above the valve body 44 and terminates in a nozzle 56 mounted in the chamber 57 within the valve body 51, said chamber 57 forming part of the passageway through which the brine flows. Soft water under pressure is forced through the nozzle 56 opening and passing the ball valve 55 into the tank 11 to the spent regenerant pipe lines which will be described. In passing through the tank 11, the brine solution regenerates the ion exchange resin contained in the tank 11. The nozzle 56 and the chamber 57 make use of the "Venturi Principle" and create sufficient suction to draw the brine solution from the dispensing container, mix it with the water from the nozzle 56, and pass the mixture through the container 11 to regenerate the ion exchange resin. When the brine solution is exhausted from the dispensing container 39, the flow of brine will be stopped as hereinafter described but the flow of fresh, unsalted water will continue for a predetermined time to completely flush the tank 11 to clear it of brine solution and when that time has elapsed the flow will be automatically stopped by the hydraulic shut off valve E which will be described in conjunction with the conduit system for disposing of the spent regenerant.

The conduit system for disposing of spent regenerant and flushing liquid includes pipe lines 58, 59 each of which have one of their ends connected to the cylinder 12 so as to be in continuous communication with passages 14, 16 respectively, and their other ends connected to and communicating with a valve 60 which has separate inlets 60a, 60b, and a discharge outlet 72. The flow of spent regenerant through the pipe lines 58, 59 is controlled by hydraulically closed check valves 61, 62 one for each inlet. The valves 60a, 60b are alternately unseated by a cam actuated valve lifter 63 which alternately lifts one valve and permits the other valve to seat. The cam actuated valve lifter 63 is actuated by a pawl and ratchet device 64, 65 respectively having a pawl actuating arm 66 operatively connected to the upper end of the connecting rod 41. A spent regenerant discharge pipe 67 connects the outlet 72 to the brine compartment 34 adjacent the top level line 38 to deliver a portion of the spent regenerant to the brine reservoir to maintain it at its proper level, any excess spent regenerant or flushing liquid being discharged to waste through an overflow conduit 68.

The system operates as follows. The drawings show the system at the commencement of a cycle that causes tank 10 to be brought into the system for delivering soft water and the tank 11 isolated and connected into the regenerating system so that the ion exchange resin contained therein will be regenerated. Under these conditions, hard water enters the casing 19 through the conduit 27 driving the water wheel 20 to rotate the valve 22 that controls the flow of a predetermined quantity of water through the tank 10 with the tank 11 isolated. When the pilot valve rotates to its next position, it will initiate a switch of the hard water supply from the container 10 to the container 11 and automatically isolate the tank 10 so that it can be regenerated. In the present position of the valves, the hard water passes through the conduit 28, passage 15, conduit 29 to the container 10 where it passes through the ion exchange resin and is delivered as soft water to the soft water system through the branch pipe 42, valve body 44, conduit 31 which forms part of the soft water distribution system. The water flow in the system described moves the ball valve 45 to the position shown and retains it on its seat, thus isolating the container 11 from the soft water being delivered by the container 10, and the valve 54, which seats by gravity, closes the inlet 52.

At the same time, a portion of the soft water is bypassed through the pipe 75, nozzle 56, into the container 11. The flow of water through the jet 56 creates sufficient suction to draw brine from the dispensing container 39 into the flowing stream which then passes into the tank 11, through the conduit 30, passage 16, pipe line 59, through the inlet 60a, discharge pipe 67 into the compartment 34, excess spent regenerant flowing to waste through discharge pipe 68. During this period, of course, the buoyant ball 49 is unseated. As the brine is withdrawn from the dispensing container 39, the brine level in the container lowers and the container rises due to buoyancy. In rising the arm 66 moves the pawl 64 one tooth on the ratchet preparatory to rotating the cam when the dispensing container 39 subsequently sinks by being refilled through the metering hole 40. Brine continues to be withdrawn from the dispensing container 39 at a greater rate than it is permitted to enter through the metering orifice 40. Consequently, the brine level ultimately reaches the point at which the buoyant ball 49 drops to its seat and stops further withdrawal of the brine. The container will at once begin to fill through the metering orifice 40 and, as it loses buoyancy, will sink. However, the ball 49 is held seated by suction until the end of the flushing cycle. As soon as the ball 49 seats, the flushing of the container 11 with fresh, unsalted water will then commence and will continue until the container 39 has sunk so that the cam actuated valve lifting member 63 is moved to a position to permit the valve 61 to seat and to unseat the check valve 62. When that takes place the flushing action ceases and no more saft water flows through the jet 56. However, brine continues to enter the dispensing container through the metering orifice 40 until the brine reaches the level 38. As the suction action has ceased, the buoyant ball 49 is released from its seat. The hydraulically interacting valve means, with the exception of the pilot valve 22, is now at rest and will remain at rest until the predetermined quantity of water has passed through the system. When that takes place, the pilot valve 22 will then have been rotated 180° to its second position; and when it comes to that next position, the piston 13 will move to the opposite end to change the position of the slide valves. This actuation will bring the tank 11 into service for delivering soft water and connect the tank 10 to the regeneration system for regeneration in exactly the same manner as described in connection with the regeneration of tank 11. The only attention this system requires is to replenish the salt in the compartment 34.

What I claim as new and desire to protect by Letters Patent of the United States is:

1. In an automatic water softening system for a pressurized water supply conduit having two tanks each of which contains an ion exchange resin for softening the water flowing therethrough, a soft water delivery conduit connected to each tank, a brine reservoir, a pipe line connected to said brine reservoir and alternately to each tank for alternately regenerating one tank when the other tank is connected to said pressurized water supply conduit and to the soft water delivery conduit; the invention herein defined comprising interacting hydraulic valve means automatically actuated by the water flowing through the system to alternately supply, on demand, soft water from one tank and regenerate the ion exchange resin in the other tank, comprising the combination of:

(a) an hydraulic master valve having a valve body with an inlet port in continuous communication with the pressurized water supply conduit and a pair of outlet ports alternately communicating by way of a first conduit and a second conduit each connected with a respective one of the tanks, and an outlet port valve member, moveable under control pressure to a first position closing one outlet port to isolate one tank from the pressurized water supply conduit during its regeneration and opening the other outlet port to establish communication between the other tank and the water supply conduit and moveable to a second position to connect said one tank and isolate other tank in relation to the water supply;

(b) an hydraulically actuated pilot valve having inlet means to receive untreated water entering the sytsem, and responsive to the flow of a predetermined quantity of water through said system, said pilot valve having fluid pressure conduit means operatively arranged and connected to said master valve to provide control pressure to position said outlet port valve member alternately at said first and said second position;

(c) spent regenerant outlet passages isolated from said pressurized water supply conduit communicable with the tanks and a spent regenerant conduit system including spent regenerant discharge conduits in communication with each tank, and hydraulic regenerant valve means responsive to the operation of said pilot valve alternately connecting the tanks to the respective spent regenerant discharge conduits whereby the isolated tank is connected to the spent regenerant discharge conduit and the other tank is isolated therefrom;

(d) an hydraulically actuated ball valve disposed in the soft water supply conduit connected between said tanks at the outlets thereof, the ball having two seats and being responsive to a change of direction of flow through the ball valve, effected by the actuation of the master valve, to seat the ball on one of said seats to close the respective outlet conduit, thereby isolating the tank from the soft water supply conduit during its regeneration;

(e) a refillable sinkable brine dispensing container communicating with the brine reservoir through a metering orifice, for holding a measured quantity of brine;

(f) a brine conduit system having at one end a pair of outlets communicating with the soft water supply conduit system, said outlets being connected to opposite sides of the hydraulically actuated ball valve and the other end of the brine conduit system being connected to the brine container and a check valve in each outlet biased to remain seated by the pressure of the fluid in the respective soft water delivery conduit when passing soft water, and to be unseated by the fluid flow in the brine conduit system during regeneration and flushing of the tank being regenerated;

(g) a brine check valve closing the end of the brine conduit system within the brine container and normally unseated when covered with brine, permitting the brine to flow into a suction system and be discharged into the isolated tank by way of a respective one of said brine conduit system outlets connected to the suction system, and to seat when the brine is exhausted from the dispensing container and remain seated until the termination of a flushing of the isolated tank with fresh, unsalted water;

(h) said suction system including a suction device connected to a pressurized source of unsalted water and to the brine conduit, to withdraw the measured quantity of brine from the container, pass it by way of the respective said brine outlet and check valve through the isolated tank, and to then provide flow through said tank of a predetermined quantity of fresh, unsalted water to flush the brine therefrom;

(i) time delay hydraulic valve means connected in flow controlling relation with said spent regenerant discharge conduits in operative relation to stop the flushing of the isolated tank by said suction device after the predetermined quantity of fresh water has passed through said regenerated tank, to thereby ready the system for the subsequent automatic regeneration of said one tank when the predetermined quantity of water has flown through the system, said regenerant valve means including a check valve in each said regenerant discharge conduit, cam control means sequentially opening said valves to open the respective said regenerant discharge conduit, and means responsive to the regenerating cycle to operate said cam control means.

2. In an automatic water system according to claim 1 in which the hydraulic master valve comprises a closed cylinder having the inlet port located centrally between its ends and the outlet ports positioned one on each side thereof, and the outlet port valve member comprises a reciprocable slide valve reacting to the pilot valve to alternately close said ports.

3. In an automatic water softening system according to claim 2 the additional feature wherein the hydraulic regenerant valve means are embodied in the said slide valve.

4. In an automatic water softening system according to claim 1 wherein said means responsive to the regenerating cycle comprises said sinkable brine dispensing container having in the bottom thereof said metering orifice, and the brine check valve operatively connected to the brine conduit by a connection permitting up and down movement of the sinkable container in response to the emptying and filling of the brine container, a pawl and ratchet device operatively connected to the cam member, and a linkage connecting said container to said pawl and ratchet device to thereby rotate the cam one increment each time the container completes one cycle of emptying and refilling.

5. In an automatic water softening system according to claim 1 in which said spent regenerant conduit system includes a pipe line connected to said brine reservoir from said regenerant discharge conduits to maintain the brine solution in the reservoir at a predetermined level, and an overflow discharge conduit for an excess spent regenerant.

6. In an automatic water softening system according to claim 1 wherein said suction device comprises a casing having a chamber therein forming part of the brine conduit and a nozzle in said chamber providing a restricted opening through which a stream of pressurized unsalted water passes thereby sucking the brine solution into the stream.

7. In an automatic water softening system for a pressurized water service for carrying out a sequence of alternately regenerating the water softening tanks, each tank containing an ionic exchange resin, a master valve connecting said tanks to a supply for untreated water automatically switching the supply of untreated water from one tank to another after a predetermined quantity of water has flowed through the system, a brine tank automatically maintained at a predetermined liquid level, brine dispensing means therein, the level thereof falling with the dispensing of the brine, water supply means connected to each tank and said brine tank automatically introducing brine into the system to alternately regenerate the ion exchange resin in one tank at a time by reverse flow therethrough and to subsequently admit water only to flush the brine therefrom, an automatic valve controlling the passage of brine and flush water reversely through the system for regenerating the ion exchange resin and controlling the passage of water from said supply for subsequently flushing the brine therefrom, said automatic valve comprising a valve body having two inlets connecting respectively with said tanks a discharge outlet, a check valve mounted in each inlet, a rotatable cam member mounted in said body and having cam surfaces alternately unseating one valve and permitting the other valve to seat, a pawl and ratchet device operable to actuate said rotatable cam member one increment at a time, and a pawl and ratchet actuating arm; a buoyant member within said brine dispensing means responsive to the rising and falling of the brine level therein, and a linkage connecting the buoyant member to the actuating arm whereby for each complete up and down movement of the buoyant member one check valve is opened and the other closed to permit regenerating and flushing flow through a respective said tank.

8. In an automatic water softening system for a pressurized water supply system for carrying out a sequence of alternately regenerating two water softening tanks each containing an ion exchange resin and connected to a water supply, a brine tank connecting with the treated water outlet of each tank, means automatically introducing brine into the system to alternately effect the regeneration of the tanks, an hydraulic master valve interposed between said water supply and said tanks for alternately directing the water supply through one tank for treatment to remove hardness therefrom and to isolate the other tank from said supply system to carry out a cycle of regeneration, said hydraulic master valve comprising an elongated hollow body closed at both ends, said water supply inlet positioned substantially centrally between the ends, a water supply outlet connecting with the respective said tanks on each side of the inlet, a slide valve mounted in said body operative to alternately establish communication between said inlet and one of said outlets, flow responsive means automatically reciprocating said slide valve after a predetermined quantity of water has flowed through the system, comprising a pressure chamber formed between each end of the slide valve and the adjacent ends of valve body, having an opening leading into each chamber through which pressurized water is admitted to one chamber and expelled from the other chamber, and a pilot valve connected to receive water flowing in the system, being responsive to the flow of a predetermined quantity of water through said system and connected in fluid pressure controlling relation with said master valve, said pilot valve comprising a casing through which said water supply flows in driving relation with a water wheel, a rotatable valve member having a first passage communicating with the water supply and a second passage communicating with atmosphere, and a gear train operatively connecting said valve member to said wheel for rotation of the valve member in predetermined response to the passage of water, and spaced conduits connecting said casing with said master valve end pressure chambers, being in respective registry with said valve passages for alternate communication of said pressurized water to the chambers, whereby said valve member alternately admits system water under pressure to one of the pressure chambers of the master valve and permits water to be expelled from the other chamber of the master valve to reciprocate the slide valve.

9. In an automatic water softening system for the automatic and substantially uninterrupted supply of softened water through alternate ion exchange resin tanks while simultaneously regenerating the other of said tanks, apparatus comprising; untreated water receiving means for connection with a pressurized water supply, having flow responsive actuator means and a pilot valve connected thereto in driven relation to provide cyclic actuation of the pilot valve in response to a predetermined flow quantity entering the system; a master control valve having a housing, and a valve member therein moveable between a first control position and a second control position; conduit means connecting said pilot valve to said master valve in position controlling relation therewith to alternate said master valve between said first and said second control position in response to cyclic reversal of said pilot valve; inlet conduit means connecting said untreated water receiving means to a port of said master valve; conduit means connecting the inlet of each said tank to said master valve, said master valve connecting said untreated water inlet to a respective said tank inlet conduit when in the respective cyclic position; tank isolation valve means connected with the treated water outlets of said tanks for connection to a treated water supply outlet, said valve means being moveable in pressure responsive relation to permit passage from a pressurized said tank to said treated water outlet while simultaneously blocking the outlet passage from the other said tank; venturi mixing means to receive pressurized water, having a one-way brine inlet for incoming brine to mix with said pressurized water, and outlets connecting with said tank outlets, having pressure responsive valve means thereat to permit passage of regenerant brine mixture or flushing water from the mixing means into the unpressurized one of said tanks during a regenerating period; brine supply means including a dispenser having an outlet connected with said venturi means, and a reservoir having an inlet to receive regenerant brine mixture after passage through a said tank, the dispenser being connected by way of a metering orifice with the reservoir to receive brine therefrom, said dispenser outlet having check valve means moveable from a normally unseated position permitting the dispensing of brine to said mixing means, to a closed position on depletion of the dispenser to terminate regeneration and to permit refilling of the dispenser from the reservoir; regenerant return flow control valve means connecting with said reservoir inlet to control the admission of recirculated and flushing liquid from said tanks; valve positioning means connnecting said return control valve with said dispenser to provide a scheduled valve operation for admission of regenerant liquid to the reservoir during emptying of said dispenser, and to permit continuing passage of flushing water from said venturi mixing means through the respective said tank during at least part of the period of filling of said dispenser from said reservoir; and conduit means connecting said master valve with said return control valve to provide a generating and wash return connection for each said tank when in the regenerating condition for passage of regenerating and wash liquid into the respective tank by way of the tank outlet, passing by way of said tank inlet conduit to said master valve, and passing through the valve to said return control valve for passage to said reservoir or to waste.

References Cited

UNITED STATES PATENTS

| | | | |
|---|---|---|---|
| 2,310,978 | 2/1943 | McGill et al. | 137—624.14 X |
| 3,056,574 | 10/1962 | Greenawalt | 137—625.29 X |
| 3,108,609 | 10/1963 | Schroder | 137—624.14 X |
| 3,154,484 | 10/1964 | Stoner | 210—191 X |
| 3,181,564 | 5/1964 | Rudelick | 137—625.18 X |
| 3,293,880 | 12/1966 | Greenawalt | 137—625.29 X |
| 3,307,581 | 3/1967 | Rudelick | 137—625.29 |
| 3,326,377 | 6/1967 | Abos | 210—191 X |
| 3,326,378 | 6/1967 | Van Mazijk et al. | 210—191 X |
| 3,333,699 | 8/1967 | Bliss et al. | 210—136 X |
| 3,405,733 | 10/1968 | Hansen | 137—624.14 |

REUBEN FRIEDMAN, Primary Examiner

C. M. DITLOW, Assistant Examiner

U.S. Cl. X.R.

137—446, 624.14, 625.29; 210—126, 134, 136, 191